No. 862,296. PATENTED AUG. 6, 1907.
W. R. TEMPLETON.
STEAM TRAP.
APPLICATION FILED JAN. 21, 1907.
2 SHEETS—SHEET 1.
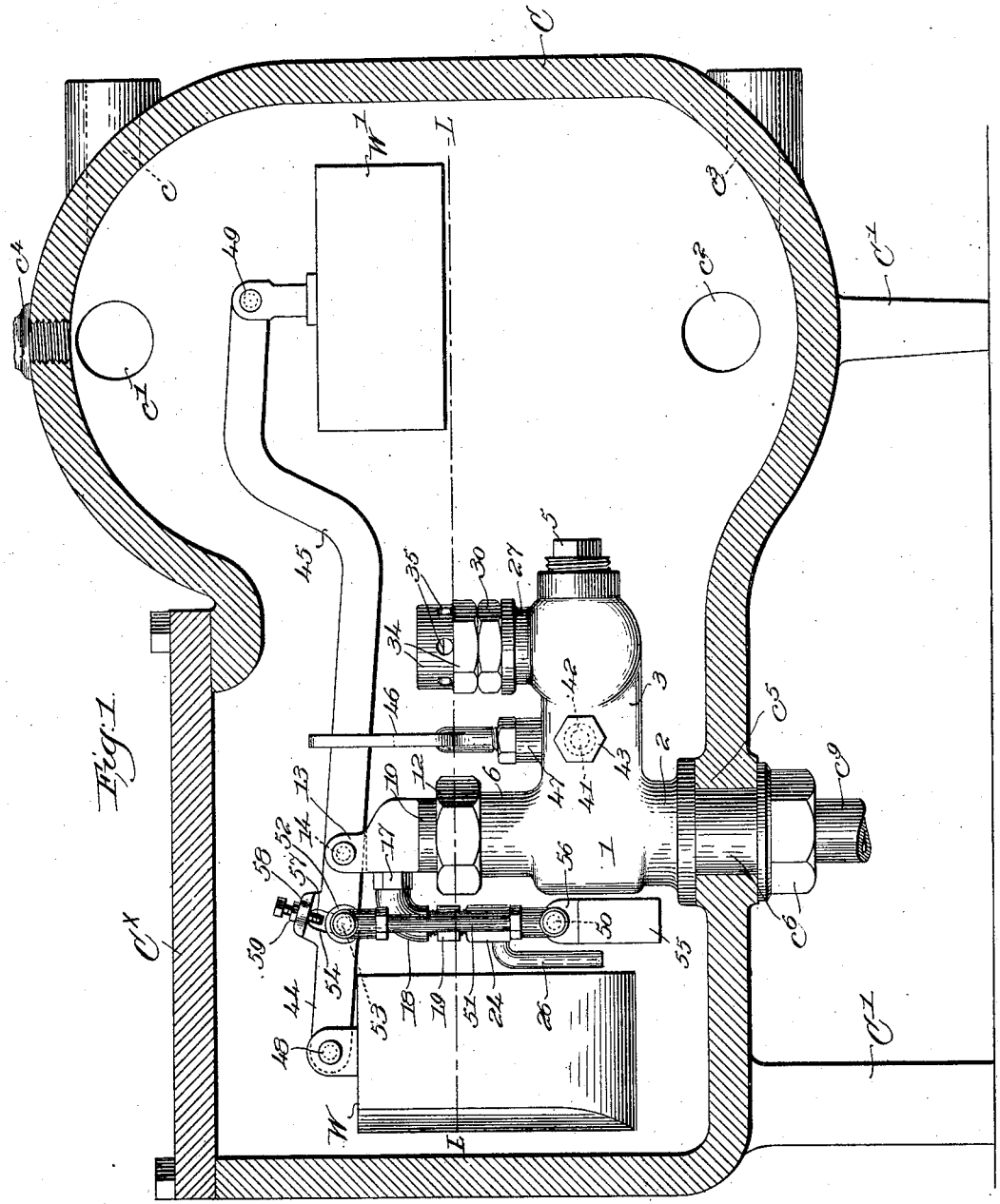

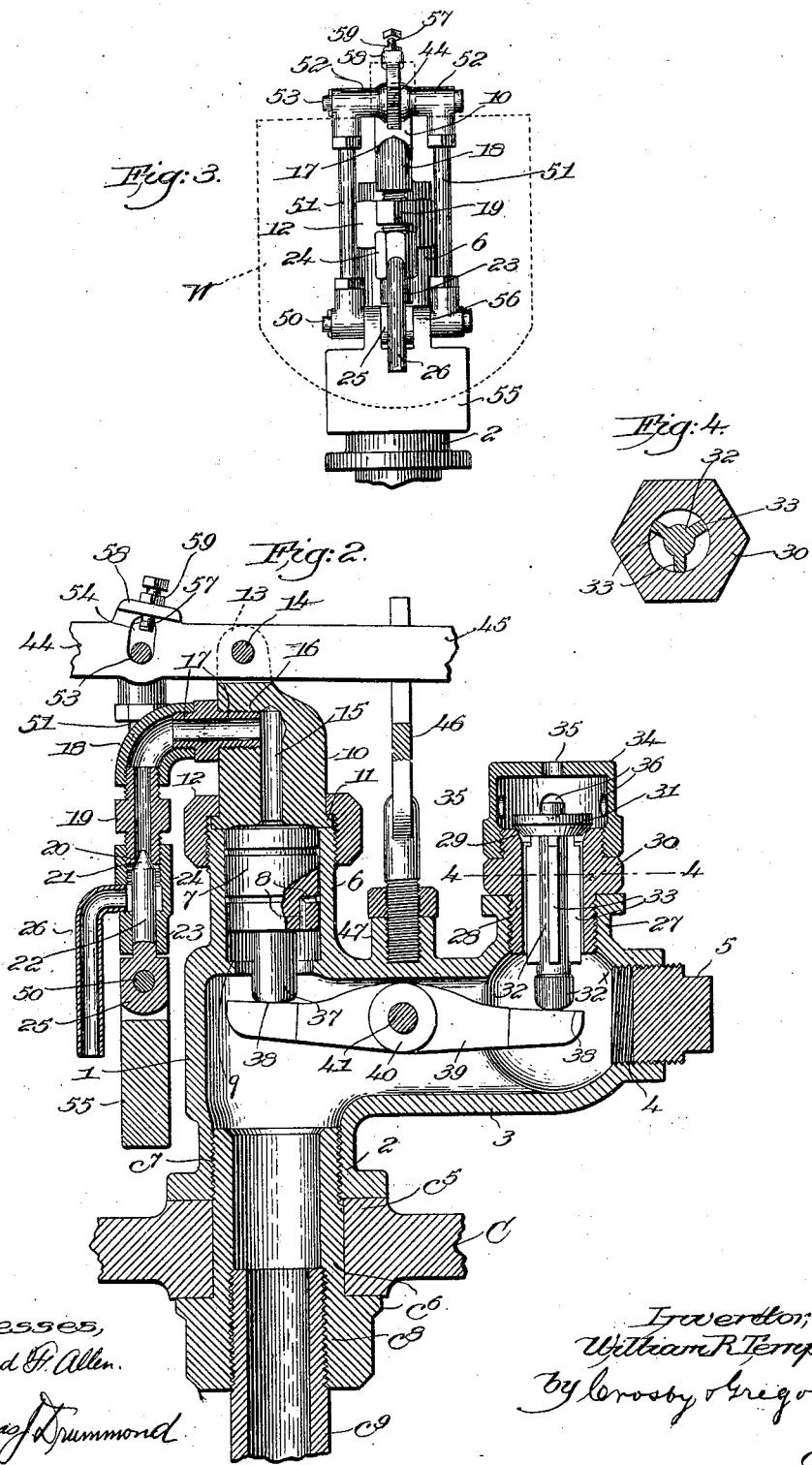

UNITED STATES PATENT OFFICE.

WILLIAM R. TEMPLETON, OF BOSTON, MASSACHUSETTS, ASSIGNOR OF ONE-HALF TO WALTER A. O'BRIEN, OF BOSTON, MASSACHUSETTS.

STEAM-TRAP.

No. 862,296.      Specification of Letters Patent.      Patented Aug. 6, 1907.

Application filed January 21, 1907. Serial No. 353,221.

*To all whom it may concern:*

Be it known that I, WILLIAM R. TEMPLETON, a citizen of the United States, and a resident of Boston, county of Suffolk, State of Massachusetts, have invented an Improvement in Steam-Traps, of which the following description, in connection with the accompanying drawing, is a specification, like letters on the drawing representing like parts.

This invention has for its object the production of a steam trap particularly adapted for use in high pressure systems, say from 100 lbs. to 250 lbs. pressure, or higher, of simple and durable construction and so arranged and operating as to discharge as frequently as may be required, and without readjustment for pressure between widely separated extremes.

While the trap is designed especially for high pressures, as will appear hereinafter, it is well adapted for use with low pressure systems, and the working pressure to which the trap is subjected may vary very greatly without in the least diminishing the efficiency of the trap or altering its large discharge capacity.

In the present embodiment of my invention I have eliminated absolutely springs, diaphragms, expansion levers, packed or stuffed joints or glands, and floats, the latter in the ordinary meaning of the term as a hollow member adapted to float upon and rise and fall with the water level in the shell or casing of the trap.

I employ but two valves, a main valve to govern the discharge or outlet port of the trap, and a controlling or pilot-valve to govern the operation of the main or outlet valve. The movements of the controlling or pilot-valve onto and from its seat are effected positively by an actuator of peculiar and novel construction, and said pilot-valve is maintained seated when the trap is in operation by the pressure in the trap, independently of the actuator, which several features of construction and operation are broadly new, so far as I am aware.

As will be pointed out hereinafter the main and controlling valve seats are readily removable for grinding or for replacement, the entire mechanism is simple and durable, and the requisite care and attention to maintain the trap in operative condition is reduced to a minimum.

The various novel features of my invention will be fully described in the subjoined specification and particularly pointed out in the claims appended thereto.

Figure 1 is a vertical sectional view of the shell or casing of the trap, and within it in elevation the operative parts embodying one form of my present invention, the movable parts being shown in the position assumed when the outlet or discharge valve and the controlling or pilot-valve are closed, that is, when the trap is under pressure; Fig. 2 is a vertical sectional view of the operative parts of the trap, the shell or casing being for the most part omitted, said parts being in the same position as illustrated in Fig. 1, but showing the construction of various portions not therein in sight; Fig. 3 is a partial left hand end elevation of the apparatus shown in Fig. 1, to more clearly show the connection between the controlling or pilot-valve and the actuator; Fig. 4 is a horizontal section on the line 4—4, Fig. 2, taken through the stem of the outlet valve and its guide casing.

The main shell or casing C, Fig. 1, having an inlet $c$ and openings $c'$, $c^2$ for a water or gage-glass usually employed in connection with steam traps, is shown as supported on feet or legs C', and it is also provided at or near its lowest point with an opening $c^3$ for a sediment blow-off cock of any suitable construction, not herein shown. An opening at the top and adjacent one end of the casing is closed by a fluid-tight closure or cover-plate $C^x$, so that by removing the latter access may be had to the interior of the casing; and the operating parts of the trap, to be described, are inserted or removed through such opening. The casing is provided with the usual pet-cock, partly shown at $c^4$, Fig. 1.

Referring to Figs. 1 and 2 the bottom of the casing C has a tubular boss $c^5$ formed thereon into which is passed part of a tubular coupling $c^6$, best shown in Fig. 2, the inner end of the coupling being externally threaded at $c^7$ and projecting above the boss, while the outer end is internally threaded at $c^8$ for connection with a tube $c^9$, said tube and coupling constituting a discharge passage or conduit for the trap.

I have provided an auxiliary or inner casing, in the present embodiment of my invention made as a casting comprising a body portion 1 having a flanged, tubular base 2 internally threaded to receive the threaded portion $c^7$ of the coupling, the flanged portion of the base resting upon the inner end of the boss $c^5$, a fluid-tight connection being formed. The casting is thus firmly and rigidly secured to the bottom of the casing C, and stands upright therein, the body portion 1 having a lateral, tubular branch 3 internally threaded at its outer end at 4, Fig. 2, to receive a plug 5, screwed tightly thereinto and effectually closing the outer or dead end of the branch. As herein shown the body 1 is formed with an upright tubular boss 6, above the base 2, and constituting a cylinder in which a piston 7 is vertically movable, said piston having a relatively loose fit in the cylinder, and in addition having a small vent passage 8 therein, for a purpose to be described. The open lower end of the cylinder is shaped to present an internal annular shoulder or seat 9, of less diameter than the piston, to limit downward movement thereof. A head 10, flanged at its lower end at 11, Fig. 2, to rest upon the upper end of the cylinder, is held in place thereon, fluid-tight, by a union or coupling 12 internally threaded, as shown, to screw onto the external thread formed on the upper end of the cylinder. The head 10 is of considerable length, as shown, and at its top is shaped to present parallel ears 13 through which is passed a horizontal pin 14 to form a fixed fulcrum for a rocking or tilting actuator, to be hereinafter described.

As shown in Fig. 2 the head has a longitudinal passage 15, communicating with the upper end of the cylinder, and intersecting a transverse, threaded hole 16 into which is screwed with a fluid-tight fit a nipple 17, the outer end of the nipple having secured to it a bend 18 having an attached depending nipple 19. I do not, however, restrict myself to this precise construction, as it is but a convenient and efficient way of forming the cylinder-head, with a passage therethrough, and with an external connection between the cylinder-head 10 and the chamber or case of an auxiliary, controlling, or pilot-valve, to be referred to.

The lower end of the nipple 19 forms an annular valve-seat 20, and with this coöperates the conical or tapered end 21 of the auxiliary or pilot-valve, the depending cylindrical stem 22 of the valve having a sliding fit in the lower end 23 of the valve-chamber 24, herein shown as internally threaded at its upper end to be screwed onto the end of the nipple 19 in which the valve-seat 20 is formed. At its lower end the valve-stem is enlarged, at 25, the area thereof being considerably larger than the area of the part of the valve 21 which coöperates with the seat.

While the valve chamber 24 is mainly below the normal level of the water in the shell or casing C, such level being indicated by the broken line L—L, Fig. 1, I prefer to absolutely guard against the entrance of grease to the said chamber, and to this end I have tapped into the valve-chamber an inlet pipe or conduit 26, the lower end or mouth of which is located substantially midway between the bottom of the casing C and the normal water level L—L.

Any sediment collecting in the casing cannot be carried up to the pilot-valve chamber, and on the other hand grease in the water at or near the surface thereof cannot enter said chamber, it being of much importance to keep the pilot-valve, its seat, and the valve-chamber free from grease or sediment, as the requirements for cleaning are thereby reduced to a minimum.

By forming the valve-seat 20 in the nipple 19, which is a connection or coupling between the valve-chamber and the bend 18, the seat can be readily removed when necessary, for inspection or regrinding, or a new nipple and valve-seat can be substituted when the old seat becomes too much worn.

The auxiliary or pilot-valve is raised to its seat, and is lowered to be unseated, and owing to the greater area of the part 25 exposed to casing pressure, that is, the fluid pressure within the casing C, the valve will be held closed by such pressure so long as it is sufficient to overcome the weight of the valve and any parts connected therewith. This valve, as will be manifest, controls the sole communication between the main shell or casing C of the trap and the interior of the cylinder 6 above the piston 7.

After referring to and describing the main or outlet valve for the discharge passage or opening of the trap, and the manner in which it is governed, I will describe the actuating instrumentality by or through which the controlling or pilot-valve is opened and closed according to the water level in the shell or casing C.

Upon the outer end of the branch 3 is formed an upright, tubular and internally-threaded boss 27, of less diameter than the cylinder 6, and into it is tightly screwed a tubular nipple 28, having formed in its upper end a preferably conical valve-seat 29, constituting an outlet or discharge port for the trap and communicating with the discharge passage thereof, hereinbefore referred to, through the body 1 and branch 3 of the auxiliary casing, as will be manifest. The polygonal enlargement 30 of the nipple 28, by means of which the latter is set up or removed, seats firmly on the top of the boss 27 and aids making the connection fluid-tight, while the readily detachable character of the nipple makes removal of the valve-seat 29 easy for grinding or otherwise. An outlet or discharge valve 31 coöperates with the valve-seat 29, and as shown in Fig. 2 the coning of the valve is sharper than that of the seat, to obviate any chance of sticking and also to effect a more accurate seating when the valve is closed, the depending valve spindle 32 having lateral wings or guides 33 which slide easily within the walls of the nipple. When the said valve is seated communication between the main casing C of the trap and the outlet or discharge passage thereof is completely shut off. A cap 34 is screwed onto the upper threaded end of the nipple 28, inclosing the outlet valve, and the cap is provided with apertures 35 to permit fluid contents of the casing C to pass into the cap and down through the outlet port 29 when the valve 31 is opened. A projection 36 on the top of the valve is adapted to coöperate with the top of the cap and thereby limit opening movement of the valve, the cap protecting the latter and preventing any large bodies of sediment or other foreign matter from passing into the outlet port.

The piston and the outlet valve are operatively connected in such manner that when the valve is seated the piston will be raised, and when the piston is moved downward the outlet valve will be raised from its seat. Said piston is not only of greater area than the valve, but it is also heavier than the valve and its attached winged stem, so that when there is no pressure in the trap the weight of the piston will cause it to descend and lift the outlet valve, so that the trap will discharge down to the low water level L—L, Fig. 1. Such an arrangement is a great convenience, for when pressure is shut off for the day, for instance, no attention is required to vent the trap to the desired extent.

The piston has a depending stud 37 on its lower end, passing below the annular shoulder 9, the rounded end of the stud coöperating with the adjacent flattened end 38 of a rocking lever or transmitter 39, having a central hub 40 and located in the branch 3 and body 1 of the auxiliary casing, see Fig. 2. The other flattened end 38 of the lever engages the rounded lower end 32× of the valve-stem 32, a transverse fulcrum pin 41 passing loosely through the lever hub 40 and fitting snugly into opposite openings in the sides of the branch 3, said openings passing through threaded bosses 42 adapted to receive caps 43, Fig. 1, screwed tightly thereon, making the openings for the fulcrum-pin fluid-tight.

Obviously, when the piston 7 descends the lever 39 will be rocked and the outlet valve 31 will be unseated or opened, and seating of the valve causes the piston to ascend, the connection between piston and valve being positive and efficient, yet with little friction in its operation.

The transmitting lever 39 is inserted in the branch 3 by removing the plug 5, after which the fulcrum pin 41 is positioned and the caps 43 screwed on, and the plug is replaced, closing the dead end of the branch.

In order that the water of condensation shall flow into the casing C the trap is located at the lowest possible point of the steam system, as is the usual practice.

Supposing that the trap is empty, that is, the water therein is down to the line L—L, Fig. 1, and that pressure is on, as with the steam system in operation, such casing pressure will act directly upon the outlet valve 31, and will close it when the pressure is sufficient to overcome the weight of the piston 7, and the trap is thus kept closed while the water accumulates therein until it attains a predetermined level, whereupon the auxiliary or pilot-valve 21 is opened. Communication between the casing C and the cylinder 6 above the piston 7 is thereby established, and the piston is subjected to fluid pressure. As the area of the piston is greater than the area of the outlet valve the opening pressure acting upon said valve will be augmented over the closing pressure thereupon, and the outlet valve will be opened promptly, effecting a full and complete discharge of the trap. When the auxiliary or controlling valve 21 is moved from its seat the full opening is attained practically instantaneously, as will be explained, and as the area of the inlet to the cylinder 10 is greater than the area of the vent or outlet passage 8, plus the area of the very slight clearance between the piston and the cylinder, the piston will be moved downward by practically the full pressure within the casing. When the valve 21 is again seated the cylinder is shut off from the main casing, and the fluid pressure within the cylinder gradually diminishes by leakage through the passage 8 in the piston, permitting the pressure in the casing to act directly upon and gradually close the outlet valve 31. The back-pressure on the piston thus acts to cushion the closing movement of the said valve 31, preventing hammering of the latter and materially reduces wear on both the valve and its seat.

I will now describe the novel means by or through which the auxiliary or pilot-valve is opened and closed, and the particular features whereby such means is particularly adapted for the highest usable steam pressures.

A rocking actuator, shown as a lever having a short arm 44 and a long arm 45, the latter bent up at its end, is fulcrumed on the pin 14 to move in a vertical plane between the ears 13, said lever being held from lateral displacement by an upright slotted guide 46, shown herein as mounted in a boss 47 on the top of the branch 3 between the cylinder 6 and the outlet valve, see Fig. 1, and in section Fig. 2. The actuator has attached to it two weight members W and W', by pivotal connections 48, 49 respectively, see Fig. 1, so that said members are suspended from the actuator, the said members being solid blocks of materials capable of withstanding high pressures and of different weights and specific gravities, and in the preferred form of my invention both having a specific gravity greater than water. In other words, neither of said members will float, but the buoyant action of water, when they are immersed therein, has a differential effect thereupon. The weight member W is conveniently a block of cast iron, combining cheapness and weight with relatively small dimensions, and it is suspended from the shorter arm 44 of the actuator, while the other member W' is preferably soapstone or similar material. For use in a trap adapted to be employed with a working pressure of from say 100 to 200 pounds to the square inch I have found a weight of about 11 pounds for the member W, and 4 pounds for the member W', to give absolutely satisfactory results.

When the trap is empty, that is, with the water therein at the level L L, Fig. 1, the block W is partly immersed and the block W' is just in contact with or slightly above the surface of the water, and at such time the member W' overbalances the member W and the weight of the connections between the actuator and the auxiliary valve, such normal position of the parts being shown in Fig. 1.

A cross-bar 50 extended through the end 25 of the valve-stem of the pilot-valve 21 has pivotally connected with its ends upturned links 51, see also Fig. 3, the upper ends of which have attached lateral sleeve-like heads 52, and they, with a pin 53 extended through them, constitute a cross-head. Said pin passes loosely through a segmental slot 54 in the lever-arm 44, Figs. 1 and 2, the slot having the fulcrum 14 as its center, and when the actuator is in normal position, shown in Fig. 1, the bottom of the slot is in engagement with the pin 53 and the pilot-valve is seated. A weight 55 is hung by apertured ears 56 on the cross-bar 50, and for the weights given for the members W and W' the weight 55 is about 1 pound. The inner ends of the heads 52 receive between them the lever-arm 44, as shown in Fig. 3, and it will be seen that the weight 55 is connected with the pilot-valve stem, and the latter with the actuator, by the connection described; but by the slot 54 there is lost motion between the actuator and the said valve, the amount depending upon the length of the slot. Such length may be varied, as by a set screw 57 held in a lateral enlargement 58 on the actuator and held adjusted by a check nut 59, the inner end of the set-screw determining the effective length of the slot.

It is supposed that the parts are as shown in Fig. 1, and that the trap is under pressure. As the water accumulates therein the members W and W' are more completely immersed, and when the member W is covered the member W' will be about three-fourths immersed, and at such time its displacement is such that the buoyant effect of the water will diminish its effective weight, and it will rise as the member W descends. This rocks the actuator, the normal overbalancing thereof being overcome, and the balance is shifted as the water level rises, but the valve 21 remains seated as the casing pressure maintains it closed, the slot 54 permitting the relative movement of the actuator. When, however, the water rises high enough to bring the upper end of the slot, i. e., the set-screw 57, against the pin 53 the slightest additional movement of the lever will move the valve 21 from its seat. Instantly the valve drops the length of the slot 54 to full open position, the rapidity of its movement being hastened by the weight 55, and the cylinder 6 above the piston 7 is in full communication with the casing, the pressure therein acting to depress the piston and open the outlet valve 31, thereby discharging the trap. From an inspection of Fig. 2, it will be seen that when the controlling or pilot-valve 21 is seated the piston 7 will be up, the casing pressure acting upon the outlet valve 31 and through the rocking transmitter 39 to maintain the piston in such position. When the valve 21 is unseated as has been described it will be manifest that the piston offers a temporary resistance to the free entrance of the fluid pressure through the valve-seat 20, and this resistance affords the weight 55 time to at once pull the valve 21 down to full open position. That is, at the instant the said valve is unseated it is still close to its seat 20, and when working with high pressures the inrush of pressure through the seat, if unretarded or not temporarily resisted, would act to immediately reseat the valve, and the unseating and reseating would be repeated, causing wire-drawing or bleeding, and a most unsatisfactory operation of the trap. As the piston acts to check or retard this inrush of pressure at the instant the valve 21 is unseated the attached weight 55 has time to act, and after so doing, thereby moving the valve completely away from its seat and giving the full opening the inrush through the valve-seat 20 has no effect whatever on the valve, but passes freely to the cylinder 6 and operates the piston to open the outlet valve 31. The opening of the pilot-valve occurs when the water in the trap attains a predetermined level, and the longer the effective length of the slot 54 the higher such level, while shortening of such effective length causes discharge when a smaller quantity of water has accumulated. As the trap discharges the water level falls and the buoyant action or effort of the water on the weight member W' diminishes, the latter regaining its effective weight correspondingly, so that it again overbalances the member W upon the shorter arm 44 of the actuator. From its abnormal position said actuator begins to rock back to normal position as the balance shifts, but the valve 21 remains fully open, and consequently the outlet valve 31 is maintained wide open, until just before low water level is reached the bottom of slot 54 picks up the pin 53 and lifts the auxiliary valve 21 to its seat. Once seated the equilibrium of pressure on the valve and its stem is destroyed and the casing pressure holds the valve 21 shut, until it is time for the trap to again discharge. When the buoyant action of the water is removed from the weight member W' its effective weight is sufficient to overbalance the weight member W, the pilot-valve, the connection between the latter and the actuator, and the small weight 55, in addition to the casing pressure on the area of the pilot-valve resisting its closure.

The pilot-valve is opened and closed quickly and sharply, so that there is in practice no wire-drawing, through the valve-seat 20, as hereinbefore explained as is the case with a slowly moving valve when opening or closing, and I thereby reduce to a minimum wear on the valve and its seat.

I have found soapstone to be a material thoroughly efficient for the lighter weight member W', as it can withstand the pressures, no matter how high, and it is not appreciably deteriorated by the action of water or steam at high pressures. So, too, by reason of its specific gravity it can be used in a convenient size, without requiring an unduly large casing.

The outlet of the trap is fully open for the complete discharge, as will be manifest, and the discharge is not effected until the predetermined water level is attained, nor is the trap outlet closed until the discharge is completed.

The weight 55 not only facilitates quick and full opening of the pilot-valve when unseated but it in a measure diminishes the size requisite for the member W', for it assists the buoyant action of the water on said member for a given displacement thereof.

It will be noted that the actuator has for its sole function the opening and closing of the pilot-valve at the proper instant, as the said valve is maintained closed by the casing pressure.

An important point in the operation of my novel trap is the fact that it operates only when it should, and as often as the trap fills, and then completely, but there is no partial operation. That is, discharge is not effected until the water attains a predetermined level in the casing, and then the discharge is complete, and no further discharge is effected until the trap is in condition for another complete discharge. The rapidity with which discharges take place depends absolutely upon the rapidity with which the water flows into the trap, and upon nothing else. If, as sometimes happens, a great rush of water occurs the outlet valve is opened when the predetermined water level is attained and it remains open just so long as the rush of water continues, and no longer. Consequently there is no "drowning" of the trap possible, no throttling of the outlet when it should be fully open, and on the other hand there is no leakage or waste of steam through the outlet when it should be shut. The outlet or discharge passage of the trap is as large as the outlet c of the shell or casing, as will be seen from an inspection of the drawings.

I have obviated altogether the use of so-called floats or hollow bodies, which will operate perfectly well with low pressures, but which cannot be depended upon for high pressures, as they will either collapse or open after very short service.

Between pressure variations of from 50 to 200 lbs. no adjustment or change in the trap is necessary, as it will operate just as well for either extreme limit or at any intermediate pressure, but over 200 lbs. I would preferably increase somewhat the weights of the members W and W' and the weight on the pilot-valve, while maintaining substantially the same relative proportions hereinbefore given.

Having fully described my invention, what I claim as new and desire to secure by Letters Patent is:—

1. In combination with the shell or casing of a steam trap having a discharge port, a valve therefor adapted to be opened and closed solely by the fluid pressure within the casing, and means to augment the valve-opening pressure when the water in the casing attains a predetermined level and to diminish such pressure when the trap has discharged, said means including a controlling valve maintained closed by the pressure within the casing as the water level therein rises, and an instrumentality to coöperate with said valve and effect opening thereof, against the pressure in the casing, when the predetermined water level is attained, and to again coöperate with and positively close the controlling valve when the trap has discharged.

2. In combination with the shell or casing of a steam trap having a discharge port, a valve therefor adapted to be opened and closed solely by the fluid pressure within the casing, and means to augment the valve-opening pressure when the water in the casing attains a predetermined level and to diminish such pressure when the trap has discharged, said means including a vertically movable controlling valve maintained closed by the pressure within the casing as the water accumulates therein, and an instrumentality to coöperate with and cause the valve to drop against the casing pressure when the water therein attains a predetermined level, and to again coöperate with and lift the controlling valve against its seat when the trap has discharged.

3. In combination with the shell or casing of a steam trap having a discharge port, a valve therefor adapted to be opened and closed solely by the fluid pressure within the casing, and means to augment the valve-opening pressure when the water in the casing attains a predetermined level and to diminish such pressure when the trap has discharged, said means including a vertically movable, weighted controlling valve independent of the outlet valve and maintained closed by the pressure within the casing as the water accumulates therein, and an instrumentality to coöperate with and unseat the controlling valve against casing pressure when the water therein attains a predetermined level, and to again coöperate with and lift the valve against its seat when the trap has discharged, the weight of the valve imparting a rapid opening movement thereto when unseated by said instrumentality.

4. In combination with the shell or casing of a steam trap having a discharge port, a valve therefor adapted to be opened and closed solely by the fluid pressure within the casing, and means to augment the valve-opening pressure when the water in the casing attains a predetermined level and to diminish such pressure when the trap has discharged, said means including a pilot-valve independent of the outlet valve and normally held closed by the pressure in the casing, and an actuator intermittently coöperating with said controlling valve and governed by the level of the water in the casing, to positively close the valve immediately upon discharge of the trap and to again coöperate with and open said valve against the casing pressure only when the water therein reaches a predetermined height.

5. In combination with the shell or casing of a steam trap having a discharge passage, an outlet valve therefor directly acted upon and closed by the fluid pressure within the casing, a piston of greater area than and operatively connected with the valve, to open the latter when the fluid pressure on the piston exceeds the closing pressure on the valve, a pilot-valve normally held closed by the casing pressure, to govern the admission of fluid pressure to the piston, and an instrumentality to open the pilot-valve against the casing pressure when the water in the casing reaches a predetermined level, and to coöperate with and positively close said pilot-valve immediately upon discharge of the trap.

6. In combination with the shell or casing of a steam trap having a discharge passage, an outlet valve therefor directly acted upon and closed by the fluid pressure within the casing, means, including an operatively connected piston of greater area than the valve, to open the latter when the fluid pressure on the piston exceeds the closing pressure on the valve, and means to subject the piston to the pressure within the casing when the water therein attains a predetermined level, said latter means including a controlling valve maintained closed by the casing pressure, and an actuator to intermittingly coöperate with and positively seat and unseat the controlling valve.

7. In combination with the shell or casing of a steam trap having a discharge port, a valve therefor adapted to be opened and closed by the fluid pressure within the casing, and means to augment the valve-opening pressure when the water in the casing attains a predetermined level and to diminish such pressure when the trap has discharged, said means including a pilot-valve normally held closed by the pressure in the casing, an actuator having a lost-motion connection with the pilot-valve and operated by the variation in level of the water in the casing, and means to vary the movement of the actuator relatively to the pilot-valve, the latter being unseated when a predetermined water level is reached and positively seated by the actuator when the trap has discharged.

8. In combination with the shell or casing of a steam trap having a discharge passage, an outlet valve therefor directly acted upon and closed solely by the pressure within the casing, a piston of greater area than and operatively connected with the valve, to open the latter when the fluid pressure on the piston exceeds the closing pressure on the valve, a pilot-valve normally held closed by the casing pressure, a chamber for the pilot-valve, an inlet for the chamber, having its mouth at all times submerged at a distance below the water level when the trap is discharged to prevent the entrance of grease to said chamber when the pilot-valve is opened, and means to intermittingly coöperate with said pilot-valve, to open it when the water level attains a predetermined height and to close it when the trap has discharged.

9. The combination, with the shell or casing of a steam trap having a discharge port, of a valve therefor directly acted upon and closed by the fluid pressure within the casing, means, including a pilot-valve, to open the valve by the action of augmented fluid pressure against the force of the closing pressure, and a device to open the pilot-valve and render said means operative to discharge the trap when the water in the casing attains a predetermined level, said device comprising a rocking actuator having attached, unequal weights, of different specific gravities greater than that of water and normally positioned by the lighter weight of less specific gravity to effect closing of the pilot-valve when the trap discharges, the buoyant action of the accumulating water upon such weight diminishing its effectiveness and thereby causing the actuator to rock into position to effect opening of the pilot-valve when the water in the casing attains the predetermined level.

10. In combination with a shell or casing of a steam trap having a discharge passage, an outlet valve therefor directly acted upon and closed by the casing pressure, a controlling piston operatively connected with and of greater area than said valve, a normally closed pilot-valve to admit fluid at casing pressure to the piston, to overcome the closing pressure on and open the outlet valve to discharge the trap, and means to open the pilot-valve when the water in the casing reaches a predetermined level, said means including a rocking actuator having attached unequal weights heavier than water and of different specific gravities, the lighter weight of less specific gravity normally positioning the actuator to close the pilot-valve, the buoyant effect of the water accumulating in the casing acting with greater force on the lighter weight and thereby causing the actuator to rock into position to effect opening of the pilot-valve when the predetermined level of the water is reached.

11. The combination, with a shell or casing of a steam trap having a discharge port, of a valve therefor directly acted upon and closed by the fluid pressure in the casing, means to open the valve by the action of augmented fluid pressure against the force of such closing pressure, and an instrumentality to render operative said means when the water reaches a predetermined level in the casing, comprising a lever having attached to its opposite arms unequal weights of different specific gravities and both non-floatable, the lighter weight normally overbalancing the heavier weight, the buoyancy of the water accumulating in the casing acting with greater effect upon the lighter weight, causing the lever to rock into abnormal position as the predetermined water level is attained.

12. The combination, with a shell or casing of a steam trap having a discharge port, of an outlet valve therefor, means to effect the opening and closing of the valve by the fluid pressure in the casing, and an actuator for said means comprising a rocking lever having a short and a long arm, a heavy metallic weight on the former and a normally overbalancing block of soapstone of less weight on the longer arm, the accumulating water in the casing exerting a greater buoyant action upon the soapstone and diminishing its effective weight sufficiently to shift the balance and cause the lever to rock to abnormal position when a predetermined water level is attained and through the valve controlling means open the outlet valve to discharge the trap, such discharge permitting the soapstone to again shift the balance and return the lever to normal position.

13. The combination, with a shell or casing of a steam trap having a discharge port, of an outlet valve therefor directly acted upon and closed by the fluid pressure in the casing, means to open the valve by the action of augmented fluid pressure when the water in the casing attains a predetermined level, and a controlling instrumentality for said means comprising a rocking lever having unequal arms, a metallic weight member on the shorter arm and a normally over-balancing, non-metallic member of less weight, such as soapstone, on the longer arm, the accumulating water in the casing exerting differential buoyant action upon said members and shifting the balance, to thereby rock the lever to abnormal position when the predetermined water level is reached and effect the operation of the opening means for the outlet valve, discharging the trap, such discharge causing the lever members to again shift the balance and return the lever to normal position.

14. The combination, with a shell or casing of a steam trap having a discharge port, of a valve therefor closed by fluid pressure within the casing acting directly upon the valve, a vertical cylinder within the casing, a piston movable therein, of greater area than and operatively connected with said valve, an auxiliary valve to govern the admission of casing pressure to the cylinder, and a lever having a lost-motion connection with the auxiliary valve, to open it when the water in the casing attains a predetermined level and thereby subject the piston to casing pressure—opening the outlet valve—and to close the auxiliary valve when the trap has discharged, the casing pressure maintaining said auxiliary valve closed as the water level rises, said lever having attached thereto unequal operating weights of different specific gravities and both of greater specific gravity than water, the auxiliary valve when closed shutting off pressure on the piston and permitting the casing pressure to close the outlet valve.

15. The combination, with a shell or casing of a steam trap having a discharge port, of a valve therefor closed by fluid pressure within the casing, means, including an auxiliary valve, to effect opening of the outlet valve by augmented pressure within the casing, the casing pressure holding the auxiliary valve closed, an actuating lever to intermittingly coöperate with the auxiliary valve, to seat and unseat it, solid, unequal weight members of different specific gravities mounted on opposite lever arms, the lighter member, of less specific gravity, normally overbalancing the other member, to cause the lever to seat the auxiliary valve, water accumulating in the casing exerting a greater buoyant action upon such lighter member and gradually rocking the lever to unseat the auxiliary valve as the water attains a predetermined level, to thereby cause discharge of the trap, the consequent lowering of the water level returning the lever to normal position and seating the auxiliary valve when discharge of the trap has been completed.

16. The combination, with a shell or casing of a steam trap having a discharge port, of a valve therefor closed by fluid pressure within the casing, means, including an auxiliary valve, to effect opening of the outlet valve by augmented pressure within the casing, the casing pressure holding the auxiliary valve closed, an actuating lever to intermittingly coöperate with the auxiliary valve, to seat and unseat it, solid, unequal weight members of different specific gravities mounted on opposite lever arms, the lighter member, of less specific gravity, normally overbalancing the other member, to cause the lever to seat the auxiliary valve, water accumulating in the casing exerting a greater buoyant action upon such lighter member and gradually rocking the lever to unseat the auxiliary valve as the water attains a predetermined pressure, to thereby cause discharge of the trap, the consequent lowering of the water level returning the lever to normal position and seating the auxiliary valve when discharge of the trap has been completed, and a weight on the auxiliary valve, to hasten the opening thereof after it has been unseated.

17. In combination with the shell or casing of a steam trap having an inlet and a discharge passage of substantially the same size, an outlet valve directly acted upon and held closed solely by the pressure within the casing, means, including a cylinder and a piston therein of greater area than the valve, to open the latter when the fluid pressure on the piston exceeds the closing pressure on the valve, and a rocking connection between the piston and the valve, and means to subject the piston to the pressure within the casing when the water therein attains a predetermined level, said latter means including a controlling valve maintained closed by the casing pressure, and an actuator to intermittingly coöperate with and seat and unseat the controlling valve.

18. In combination with the shell or casing of a steam trap having a discharge passage, and an outlet valve therefor directly acted upon and closed solely by the fluid pressure within the casing, a piston of greater area than the valve, and movable in a path parallel thereto, a rocking transmitter operatively connected with said piston and valve and effecting their movement in opposite directions, to open the valve when the fluid pressure on the piston exceeds the closing pressure on the valve, a pilot-valve to govern admission of fluid pressure to the piston, and an instrumentality to open the pilot-valve when the water in the casing reaches a predetermined level, and to close said pilot-valve immediately upon discharge of the trap.

19. In a device of the class described, a shell or casing having a discharge passage, an outlet valve therefor directly acted upon and closed solely by fluid pressure within the casing, a piston of greater area than the valve, a rocking connection between them, to open the valve when the closing pressure thereon is exceeded by the fluid pressure on the piston, a cylinder in which the piston is movable, a controlling-valve to govern the admission of casing pressure to the cylinder, a seat for said valve, the latter being maintained seated solely by the casing pressure, a weight attached to the controlling-valve, and means to intermittingly coöperate with said valve to unseat it when the casing fills with water and to seat it when the trap has discharged, the temporary resistance to the incoming fluid pressure exerted by the piston when the controlling-valve is unseated causing the attached weight to instantly move said valve to full open position and permit free passage of the fluid pressure through the valve-seat.

20. In a device of the class described, a shell or casing having a discharge passage, an outlet valve therefor directly acted upon and closed solely by fluid pressure within the casing, a piston of greater area than and operatively connected with the valve, to open it when the closing pressure on the valve is exceeded by the fluid pressure on the piston, a cylinder in which the piston is movable, a valve-chamber communicating with the cylinder and having a valve-seat, a pilot-valve coöperating therewith and having an attached weight, said valve being maintained seated solely by the casing pressure, an inlet for the chamber having its mouth below the level of the water in the casing when the trap is discharged, to thereby prevent the entrance of grease into the chamber when the pilot-valve is unseated, said inlet opening into the chamber below the valve-seat, and means to intermittingly coöperate with said valve to unseat it when the casing fills with water and to seat it when the trap has discharged, the temporary resistance to the incoming fluid pressure exerted by the piston when the controlling-valve is unseated causing the attached weight to instantly move said valve to full open position and permit free passage of the fluid pressure through the valve-seat.

In testimony whereof, I have signed my name to this specification, in the presence of two subscribing witnesses.

WILLIAM R. TEMPLETON.

Witnesses:
JOHN C. EDWARDS,
EMILY C. HODGES.